US008788192B2

(12) United States Patent
McMahan et al.

(10) Patent No.: US 8,788,192 B2
(45) Date of Patent: Jul. 22, 2014

(54) NAVIGATION METHOD, SYSTEM OR SERVICE AND COMPUTER PROGRAM PRODUCT

(75) Inventors: Paul F. McMahan, Apex, NC (US); Robert T. Uthe, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 1529 days.

(21) Appl. No.: 10/908,585

(22) Filed: May 18, 2005

(65) Prior Publication Data

US 2006/0265119 A1 Nov. 23, 2006

(51) Int. Cl.
*G01C 21/30* (2006.01)
*G01C 21/32* (2006.01)
*G01C 21/00* (2006.01)

(52) U.S. Cl.
USPC ............ 701/411; 701/400; 701/409; 701/467

(58) Field of Classification Search
None
See application file for complete search history.

(56) References Cited

U.S. PATENT DOCUMENTS

| | | | | |
|---|---|---|---|---|
| 5,363,306 A * | 11/1994 | Kuwahara et al. | ............ | 701/461 |
| 5,638,279 A * | 6/1997 | Kishi et al. | ..................... | 701/437 |
| 5,793,631 A * | 8/1998 | Ito et al. | ......................... | 701/431 |
| 6,269,304 B1 * | 7/2001 | Kaji et al. | ..................... | 701/533 |
| 6,339,746 B1 | 1/2002 | Sugiyama et al. | | |
| 6,438,472 B1 * | 8/2002 | Tano et al. | ................... | 701/29.6 |
| 6,484,092 B2 | 11/2002 | Seibel | | |
| 6,505,118 B2 | 1/2003 | Chowanic et al. | | |
| 6,577,950 B2 | 6/2003 | Shimazu | | |
| 6,661,372 B1 | 12/2003 | Girerd et al. | | |
| 6,662,102 B2 | 12/2003 | Katayama et al. | | |
| 6,700,505 B2 * | 3/2004 | Yamashita et al. | ............ | 340/988 |
| 6,778,905 B2 | 8/2004 | Horikami | | |
| 6,909,968 B2 * | 6/2005 | Yokota | .......................... | 701/431 |
| 7,167,796 B2 * | 1/2007 | Taylor et al. | ................... | 701/431 |
| 7,292,867 B2 * | 11/2007 | Werner et al. | .............. | 455/456.3 |
| 7,395,154 B2 * | 7/2008 | Kikuchi et al. | ............... | 701/410 |
| 7,526,268 B2 * | 4/2009 | Fruit et al. | ................. | 455/404.2 |
| 2003/0163251 A1 * | 8/2003 | Obradovich et al. | ......... | 701/208 |
| 2004/0039520 A1 * | 2/2004 | Khavakh et al. | .............. | 701/201 |
| 2004/0093157 A1 | 5/2004 | Muller et al. | | |
| 2004/0102899 A1 * | 5/2004 | Kaji et al. | ..................... | 701/210 |
| 2004/0148094 A1 * | 7/2004 | Katou | .......................... | 701/201 |
| 2004/0148095 A1 * | 7/2004 | Katou | .......................... | 701/201 |
| 2004/0148096 A1 * | 7/2004 | Katou | .......................... | 701/201 |
| 2004/0203860 A1 | 10/2004 | Fellenstein et al. | | |
| 2004/0260466 A1 | 12/2004 | Ichihara et al. | | |
| 2005/0004754 A1 | 1/2005 | Hayes | | |
| 2005/0071078 A1 * | 3/2005 | Yamada et al. | ............... | 701/201 |
| 2005/0231394 A1 * | 10/2005 | Machii et al. | ............. | 340/995.13 |
| 2006/0178814 A1 * | 8/2006 | Everett | .......................... | 701/205 |
| 2006/0178817 A1 * | 8/2006 | Suzuki et al. | ................. | 701/209 |
| 2006/0256005 A1 * | 11/2006 | Thandu et al. | ........... | 342/357.06 |

* cited by examiner

*Primary Examiner* — Bhavesh V Amin
*Assistant Examiner* — Nicholas Kiswanto
(74) *Attorney, Agent, or Firm* — Moore & Van Allen PLLC

(57) ABSTRACT

A navigation method, system, service and computer program product may include providing enhanced travel instructions in response to receiving a destination and detailed travel directions from at least one waypoint to the destination being available.

15 Claims, 5 Drawing Sheets

NAVIGATION METHOD, SYSTEM OR SERVICE AND COMPUTER PROGRAM PRODUCT

BACKGROUND OF THE INVENTION

The present invention relates to on-line direction or navigation services, navigation systems, global positioning satellite navigation systems or devices, and the like, and more particularly to a navigation method, system or service and computer program product with improved navigation accuracy to a destination.

As used herein, the terms system and service are interchangeably and either may define any navigation, map or travel direction system or service, such as Mapquest™, Mapsource™ or similar services or systems. Mapquest is a trademark of Geosystems Global Corporation in the United States, other countries or both and Mapsource is a trademark of Garmin Corporation in the United States, other countries or both. Such navigation systems can navigate or provide directions to an address and are generally accurate up to a "homestretch" or last half mile or so to the ultimate destination. The last half mile or so may be very difficult as the navigation system or service is merely guessing or estimating where a street number or specific destination may actually exist on a street. Such navigation systems and services cannot take into account some factors. For example, a hotel, resort or point of interest may occupy an extensive area, such as several city blocks. A property may have its own private entrance or access road off a main road. A property may have multiple entrances or other factors or details that may not be accounted for in providing directions to a particular location. Such systems or services also may not take into account landmarks or provide such cues to users or travelers. The user typically has to rely on actually seeing a visual cue like a hotel sign or other physical landmark rather then the navigation system or service alerting the user and guiding them the entire way.

BRIEF SUMMARY OF THE INVENTION

In accordance with an embodiment of the present invention, a navigation method may include receiving a destination. The method may also include providing enhanced travel instructions in response to detailed travel directions from at least one waypoint to the destination being available.

In accordance with another embodiment of the present invention, a navigation method may include invoking a navigation service in response to activation of a predefined feature. The method may also include passing a parameter for at least one set of detailed directions to a destination in response to invoking the navigation service. In one embodiment, the predefined feature may be a "map" feature, "get directions" feature or the like. The parameter passed may include a Universal Resource Locator (URL) to detailed direction metadata.

In accordance with another embodiment of the present invention, a navigation service or system may include at least one set of detailed travel directions from at least one waypoint to a destination. The service or system may also include means to provide enhanced travel instructions to the destination based on the at least one set of detailed travel directions.

In accordance with another embodiment of the present invention, a computer program product to improve navigation accuracy may include a computer readable medium having computer readable program code embodied therein. The computer readable medium may include computer readable program code configured to provide enhanced travel instructions in response to receiving a destination and detailed travel directions from at least one waypoint to the destination being available.

In accordance with another embodiment of the present invention, a navigation system or service may contain a library or database including detailed directions to a multiplicity of different destinations, such as businesses, hotels, restaurants, sports and entertainment facilities, points of interest or the like. When a user requests a route to a destination in which a "homestretch" or detailed directions from a waypoint are available, the system or service may calculate a route to the best or optimum waypoint and then append the path or detailed directions from that waypoint to the destination. If a given destination does not have any detailed directions or a "homestretch," the navigation system or service may estimate the directions to the ultimate destination from the waypoint based on general map or street information that may be available or contained in the system or service. If there is a single set of detailed directions or a single "homestretch" available from the best or optimum waypoint, the system or service may append the path or route defined by those detailed directions. If multiple sets of detailed directions are available from a best waypoint to a destination, the system or service, at the user's option, can provide or list the multiple different routes, superimpose the multiple routes on a single map, or both. The user may then select the desired detailed route. In accordance with a further embodiment of the present invention, the detailed directions could also be rated such that the system or service may provide the sets of detailed directions ranked or sorted according to a predetermined criteria, such as feedback or ranking from other users, shortest distance, shortest time, most scenic, most use of expressways, least use of expressways or similar criteria.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1A:
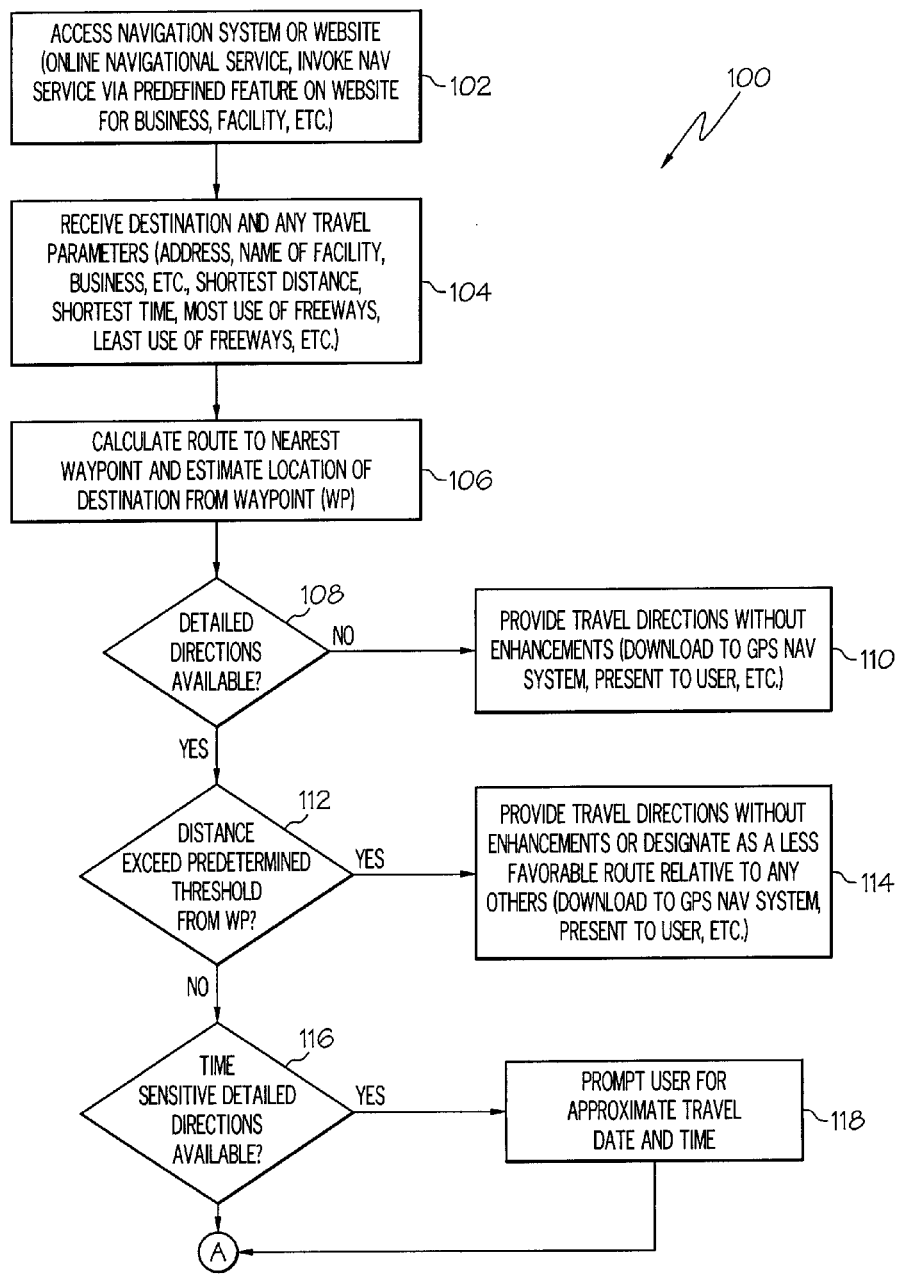
FIGS. 1A and 1B (collectively FIG. 1) are a flow chart of an example of a method to improve navigation accuracy in accordance with an embodiment of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit", "module," or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk or C++, or the like. However, the computer program code for carrying out operations of the present invention may also be written in conventional procedural programming languages, such as the "C" programming language, or a similar language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a public purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The following detailed description of preferred embodiments refers to the accompanying drawings, which illustrate specific embodiments of the invention. Other embodiments having different structures and operations do not depart from the scope of the present invention.

Figure 1B:
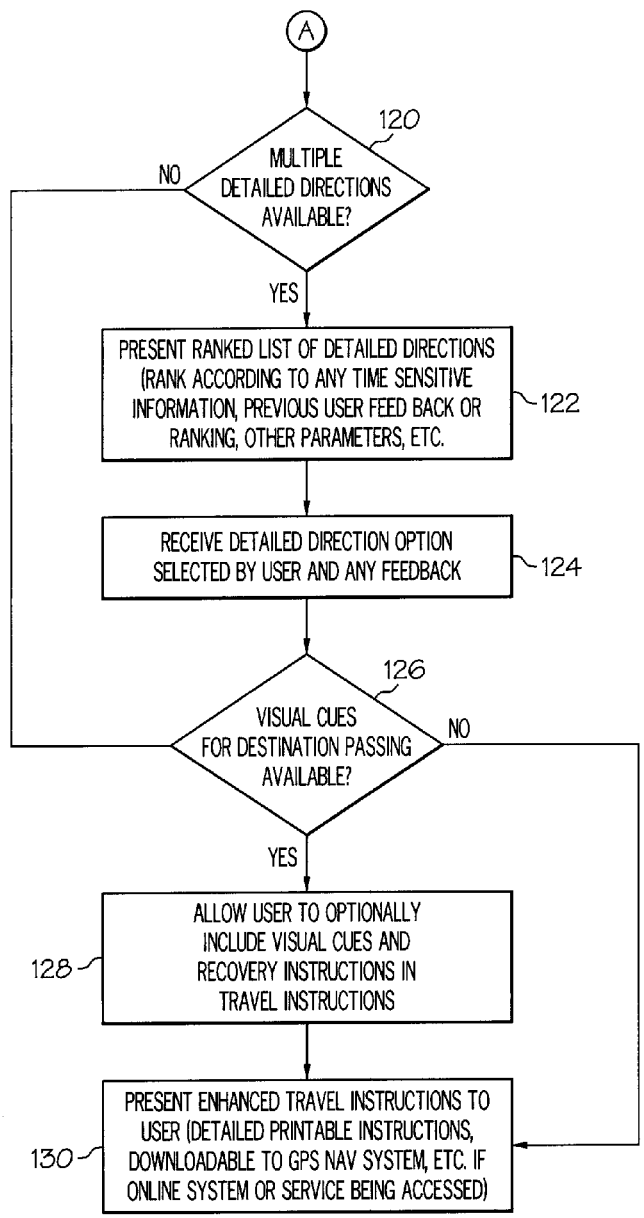

FIGS. 1A and 1B (collectively FIG. 1) are a flow chart of an example of a method 100 to improve navigation accuracy in accordance with an embodiment of the present invention. In block 102, a navigation system, service or website may be accessed. In another embodiment of the present invention, a website for a business or other facility or point of interest may have a link or predefined feature for detailed directions to the destination. By "clicking-on" or otherwise activating the predefined feature, a navigation service or system, such as Mapquest™ or the like, may be invoked. The predefined feature may be a "map" feature, button or icon, a "get directions" feature, button or icon or any other feature that may be "clicked-on" using a computer pointing device, mouse or the like to invoke or access the navigation service. In invoking the navigation service or system, the business or other entity may pass a parameter which may be a Universal Resource Locator (URL) to the business' detailed direction metadata or the like. The detailed directions may be appended to directions to a closest or most convenient waypoint by a navigation service or system in providing detailed end-to-end directions.

In block 104, a destination may be received or entered by a user along with any other travel parameters. The destination may be an address, name of a facility or business, point of interest or the like. Other parameters that may be received or entered may include providing instructions based on a shortest distance, a shortest route, most use of freeways, least use of freeways, most scenic route or other parameters.

In block 106, a route or travel instructions to a waypoint proximate to or nearest the destination may be calculated or determined along with an estimate of the location of the destination from the waypoint. In block 108, a determination may be made whether detailed directions from the waypoint to the destination are available. A business or some third party may have uploaded or registered detailed directions to the destination or address from nearby waypoints. Under these circumstances, the navigation system or service may calculate the route up to the waypoint and then the business or other entity may provide homestretch directions or detailed directions from this waypoint to the ultimate destination. A user of the system or service may be completely unaware of this as the entire route end-to-end may be presented or provided. The homestretch directions may be provided and customized by the destination party or entity. For example, a hotel, business or entity associated with the destination could provide landmarks that are nearby and a visual description of their facilities, i.e., "Look for the green and blue sign with the seagull on it." The hotel could even provide information about the easiest way to navigate through their parking lot to reach the check-in counter. Homestretch directions may also be provided by another entity that may be anonymous. A chamber of commerce or even end users of the system who know the area and would like to help other travelers (maybe help them avoid a difficult experience they may have had) may provide homestretch detailed directions. If multiple homestretch directions are available for a single destination then the user may choose between the multiple directions based on the ranking given to those directions by other users of the system, as described in more detail herein.

If detailed directions are not available in block 108, the method 100 may advance to block 110. In block 110, travel directions may be provided without the enhancements or detailed directions and any other information from the waypoint to the ultimate destination. The travel directions without enhancements may be downloaded to a Global Positioning Satellite (GPS) equipped navigation system or device, presented to a user for printing or other purpose if an online system or service is being accessed.

If detailed directions are available in block 108, the method 100 may advance to block 112. In block 112, a determination may be made if the distance of a path or route defined by the detailed directions exceeds a distance that the navigation service or system would have guided the user without the detailed directions by a predetermined threshold. For example, if the distance of a path or route defined by the detailed directions exceeds the estimated distance from the waypoint to the destination without utilizing the directions by about 200% a predetermined action may be implemented. Examples of such predetermined actions are indicated in block 114. Accordingly, if the distance the path defined by the detailed directions exceeds the predetermined threshold, the method may advance to block 114. In block 114, the detailed directions may be ignored or rejected and the travel directions may be provided without enhancements. Alternatively, the route may be designated as a less favorable option relative to other routes or detailed directions when provided or presented to the user. Blocks 112 and 114 define a safeguard in the method or system in case bogus information or data has been provided with respect to the detailed directions. As will be discussed in more detail, another safeguard may be provided by permitting users to provide rankings or textual feedback on the detailed directions that may be available to subsequent users.

If the distance from the detailed directions compared to the distance without does not exceed the predetermined threshold in block 112, the method 100 may advance to block 116. In block 116, a determination may be made if time sensitive detailed directions are available. For example, some routes may be more efficient or faster from a waypoint to the destination on certain dates, days of the week and time of day than other routes. If time sensitive detailed directions are available, the user may be prompted for an approximate date and time of travel in block 118. The user may be prompted by presenting a graphical user interface (GUI) or the like on a display or monitor of a navigation system or device or computer system the user is utilizing to access an online navigation system or service. The user may enter the travel date and time in the GUI for use by the system or service to provide time sensitive detailed travel directions.

In block 120, a determination may be made if multiple sets of detailed directions are available from one or more waypoints to the destination. If not, the method 100 may advance to block 126 which is described in more detail below. If multiple sets of detailed directions are available, a list of the different sets of detailed directions may be provided in block 122 for selection by a user. The different sets of detailed directions may be ranked or sorted according to predetermined criteria. Examples of the predetermined criteria may include any time sensitive information, previous user feedback or rankings, shortest distance, shortest time, most scenic router, least use of expressways, most use of expressways, or other parameters that may be entered or selected by a user. In block 124, the detailed directions set or option selected by user may be received by the system or service along with any feedback from the user.

In block 126, a determination may be made if any visual cues, recovery directions or the like are available in the event the destination is passed or missed. If no visual cues or recovery directions are available, the method 100 may advance to block 130 as described below. If a set of visual cues or recovery directions are available, the method 100 may advance to block 128. In block 128, the user may be allowed to optionally include the visual cues and any recovery instructions in the enhanced travel instructions.

In block 130, the enhanced travel instructions may be presented or provided to the user. The enhanced or detailed travel instructions may be printable for the user to take along or may be downloadable to a GPS navigation system or the like if the system or service is being accessed online.

Figure 2A:
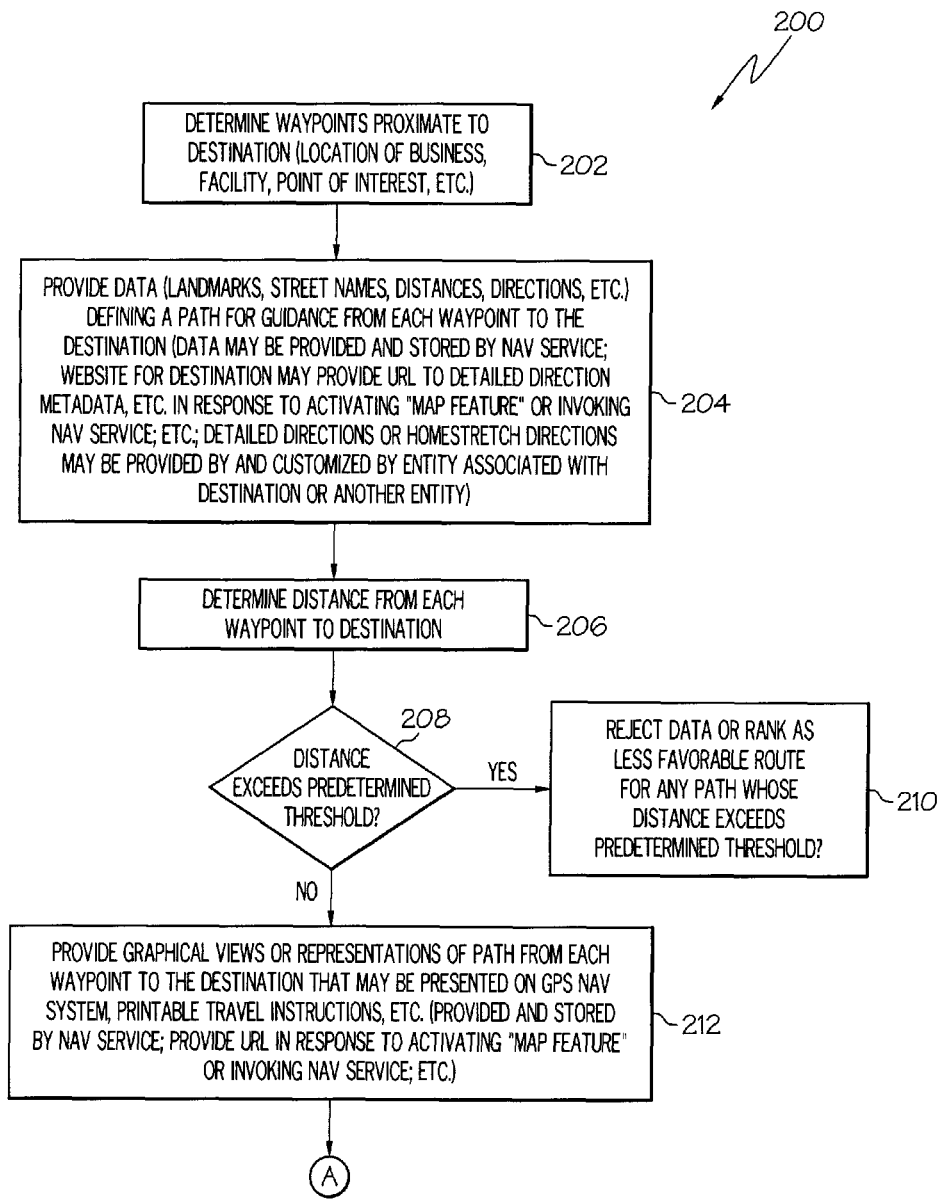
FIGS. 2A and 2B (collectively FIG. 2) are a flow chart of an example of a method to provide detailed travel directions to a destination in accordance with an embodiment of the present invention.
Figure 2B:
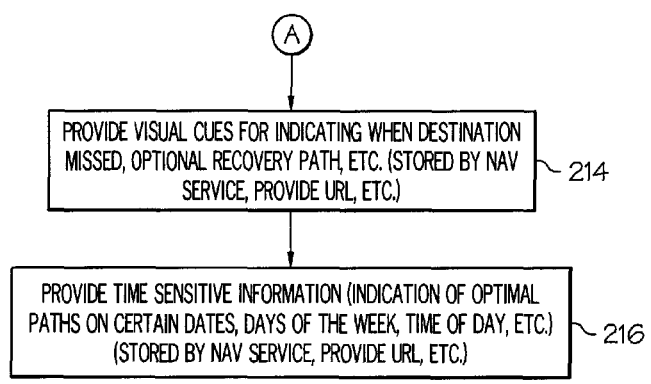

FIGS. 2A and 2B (collectively FIG. 2) are a flow chart of an example of a method 200 to provide detailed travel directions to a destination in accordance with an embodiment of the present invention. In block 202, waypoints proximate to a destination may be determined. The destination may be an address of a business or other facility, a point of interest or the like. In block 204, data may be provided to define a path for guidance from each waypoint to the destination. The data may include information or data related to landmarks, street names, distances, directions or the like to provide detailed directions incorporating the data of information from each waypoint to the destination. The data may be provided to the navigation service or system and customized by a business or other entity, as previously described, and may be stored by a navigation service or system in a library or database. In another embodiment of the present invention, a website for a destination, business or other entity may provide a URL to detailed direction metadata or the like in response to activating a "map feature" or invoking a navigation service or system similar to that previously described. The travel instructions from the navigation service or system may then be enhanced with the detailed directions and other information provided via the URL.

In block 206, a distance from each waypoint to the destination may be determined. In block 208, a determination may be made if the distance of a path or route defined by the detailed directions compared to the distance determined by the system or service without the detail directions exceeds a predetermined threshold, similar to that previously described with respect to block 112 in FIG. 1. In block 210, the data or detailed directions may be ignored or rejected or the detailed directions may be ranked as a less favorable route for any path whose distance exceeds the predetermined threshold. Blocks 208 and 210 define a safeguard against bogus travel information getting into the system or any other problem that may adversely affect the detailed travel directions that may be provided.

In block 212, graphical views or representations of the path may be provided from each waypoint to the destination. The graphical views or representations may illustrate turning directions on specific streets, landmarks passed or other cues for the traveler in following the path or route from the waypoint to the destination. The graphical views and representations may be presented on a GPS navigation system, downloaded to a GPS navigation system for presentation real-time during travel, printable travel instructions or the like. Data or information for the graphical views or representations may be provided by a business or other entity and stored by the navigation system or service. In another embodiment of the present invention, the graphical views or representations may be provided at a URL or website in response to activating a "map feature" or the like on a business' or facility's website or by invoking a navigation system or service in some manner. The graphical views or representations may then be combined with the direction information to a waypoint available from the navigation service or system.

In block 214, a set of visual cues and an optional recovery path or set of instructions or the like may be provided for indicating when a destination is missed of passed. Similar to the graphical views and representations, the visual cues and recovery path information may be provided by a business and stored by a navigation system or service, or a URL containing metadata for the visual cues and recovery path instructions may be provided in response to invoking a navigation system or service from the business's website.

In block 216, time sensitive information may be provided similar to that previously discussed. The time sensitive information may include an indication of optimal paths or routes on certain dates, days of the week, time of day or the like. Similar to other detailed directions and information in blocks 204, 212 and 216, the time sensitive information may be provided by the business or facility and stored by the navigation system or service or provided at a URL that may be accessed in response to invoking a navigation system or service from the business' or facility's website similar to that previously described.

Figure 3:
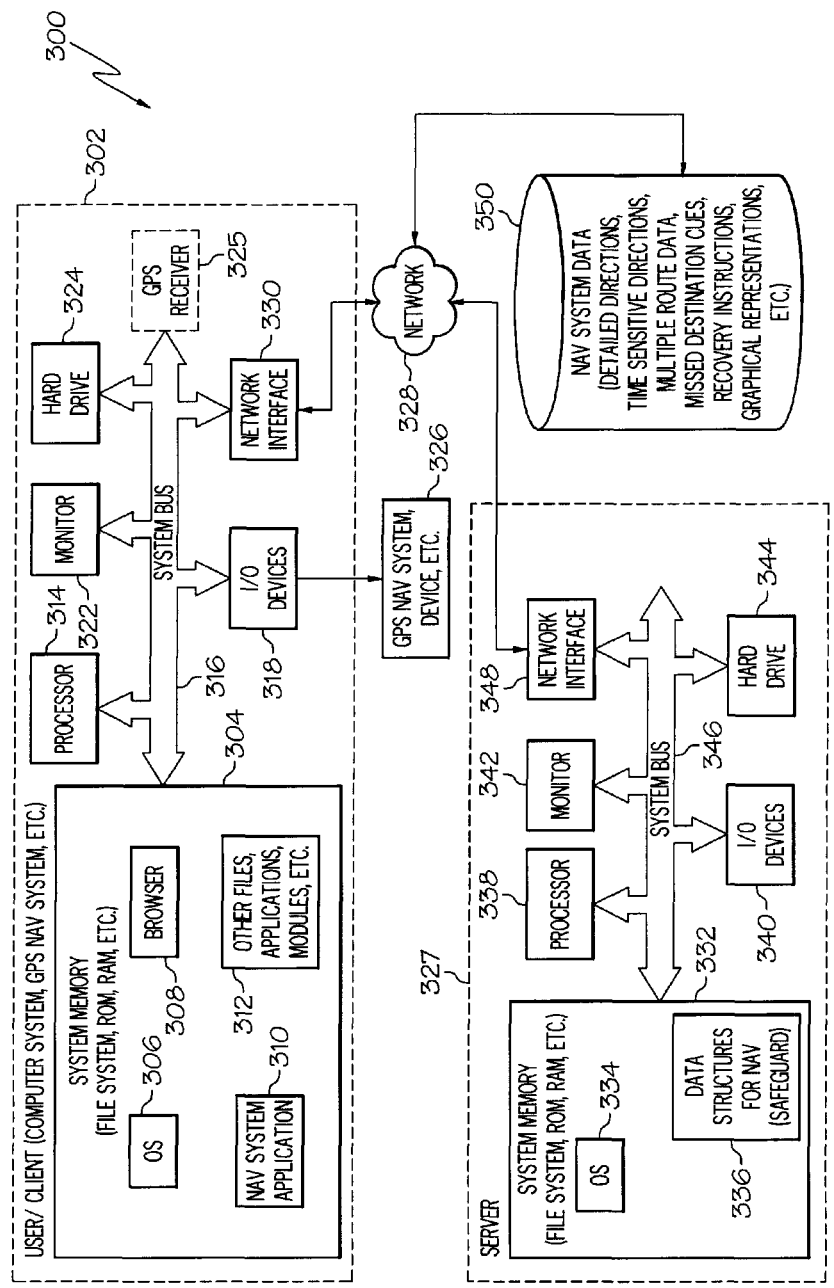
FIG. 3 is a block diagram of an exemplary system to improve navigation accuracy in accordance with an embodiment of the present invention.

FIG. 3 is a block diagram of an exemplary system 300 to improve navigation accuracy in accordance with an embodiment of the present invention. The elements of the methods 100 and 200 may be embodied in and performed by the system 300. The system 300 may include one or more user or client or user devices 302 or similar systems or devices. Each device 302 may be a computer system, a personal digital assistant, a cellular phone, a GPS navigation device or similar device capable of sending and receiving electronic messages or signals, providing point-to-point guidance or navigation, accessing a network, such as the Internet or the like, or a similar device or system.

The device 302 may include a system memory 304 or local file system. The system memory 304 may include a read only memory (ROM) and a random access memory (RAM). The ROM may include a basic input/output system (BIOS). The BIOS may contain basic routines that help to transfer information between elements or components of the device 302. The system memory 304 may contain an operating system 306 to control overall operation of the device 302. The system memory 304 may also include a browser 308 or web browser. The system memory 304 may also include a navigation system application 310, data structures or computer-executable code to improve navigation accuracy that may be similar to or include elements of the method 100 in FIG. 1 and method 200 in FIG. 2. The system memory 304 may further include other files 312, applications, modules or the like for performing other functions or operations.

The device 302 may also include a processor or processing unit 314 to control operations of the other components of the device 302. The operating system 306, browser 308, and navigation system application 310 may be operable on the processor 314. The processor 314 may be coupled to the memory system 304 and other components of the device 302 by a system bus 316.

The device 302 may also include multiple input devices, output devices or combination input/output devices 318. Each input/output device 318 may be coupled to the system bus 316 by an input/output interface (not shown in FIG. 3). The input and output devices or combination I/O devices 318 permit a user to operate and interface with the device 302 and to control operation of the browser 308 and navigation system application 310 to access, operate and control the software to improve navigation accuracy. The I/O devices 318 may include a keyboard, keypad, computer pointing device or the like to perform the operations discussed herein.

The I/O devices 318 may also include disk drives, optical, mechanical, magnetic, or infrared input/output devices, modems or the like. The I/O devices 318 may be used to access a medium. The medium may contain, store, communicate or transport computer-readable or computer-executable instructions or other information for use by or in connection with a system, such as the communication devices 302.

The device 302 may also include or be connected to other devices, such as a display or monitor 322. The monitor 322 may be used to permit the user to interface with the device 302. The monitor 322 may present the detailed directions and other information discussed with respect to methods 100 and 200 of FIGS. 1 and 2, respectively.

The device 302 may also include a hard disk drive 324. The hard drive 324 may be coupled to the system bus 316 by a hard drive interface (not shown in FIG. 3). The hard drive 324 may also form part of the local file system or system memory 304. Programs, software and data may be transferred and exchanged between the system memory 304 and the hard drive 324 for operation of the device 302.

In one embodiment of the present invention, the device 302 may also be equipped with a GPS receiver 325 to be used in conjunction with the detailed direction information for navigation. In another embodiment of the present invention, where the device 302 does not include a GPS receiver 325, a GPS navigation system or device 326 may be coupled to the device 302 for downloading detailed directions and other travel instructions to the GPS navigation device 326.

The devices 302 may communicate with a remote server 327 and may access other servers or other devices similar to device 302 via a network 328. The system bus 316 may be coupled to the network 328 by a network interface 330. The network interface 330 may be a modem, Ethernet card, router, gateway or the like for coupling to the network 328. The coupling may be a wired connection or wireless. The network 328 may be the Internet, private network, an intranet or the like.

The server 327 may also include a system memory 332 that may include a file system, ROM, RAM and the like. The system memory 332 may include an operating system 334 similar to operating system 306 in communication devices 302. The system memory 332 may also include data structures 336 to improve navigation accuracy. The data structures 336 may include operations similar to those described with respect to the methods 100 and 200 in FIGS. 1 and 2, respectively.

The server 327 may also include a processor 338 or a processing unit to control operation of other devices in the server 327. The server 327 may also include I/O device 340. The I/O devices 340 may be similar to I/O devices 318 of devices 302. The server 327 may further include other devices 342, such as a monitor or the like to provide an interface along with the I/O devices 340 to the server 327. The server 327 may also include a hard disk drive 344. A system bus 346 may connect the different components of the server 327. A network interface 348 may couple the server 327 to the network 328 via the system bus 346.

The system 300 may also include a database 350, data source or library. The database 350 may include navigation system data that may include sets of detailed directions, time sensitive directions, multiple route data, missed destination cues, recovery instructions, graphical representations and the like. The database 350 may be accessed via the network 328 or may be directly accessed by the server 327 or device 302. In an alternate embodiment of the present invention, the information contained in database 350 may be stored on the server 327.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A navigation method, comprising:
receiving a destination by a navigation device;
calculating a route from a first location to a waypoint by the navigation device, the waypoint being a location proximate to the destination; and
providing detailed travel directions via a non-GPS network from the waypoint to the destination by the navigation device so that the navigation device provides complete directions from the first location to the destination in response to the detailed travel directions from the waypoint to the destination being available, wherein the detailed travel directions comprise landmarks or visual cues to define a path for guidance from the waypoint to the destination, the detailed travel directions being provided and customized by an entity affiliated with the destination; and
determining a distance of the path from the waypoint to the destination; and one of:
rejecting the detailed travel directions in response to the distance of the path exceeding a predetermined threshold; and
ranking the detailed travel directions as unfavorable in response to the distance of the path exceeding the predetermined threshold; wherein the method further comprises:
determining the distance of the path defined by the detailed travel directions by the navigation device; and
providing a safeguard that the detailed travel directions are bogus in response to the distance from the waypoint to the destination exceeding the predetermined threshold.

2. A navigation service executed by a processor, comprising:
at least one set of detailed travel directions from at least one waypoint to a destination provided from a non-GPS source, wherein the at least one waypoint comprises a location proximate to the destination, and wherein the at least one set of detailed travel directions are provided and customized by an entity affiliated with the destination and comprises:
a list of multiple sets of detailed directions sorted or ranked by at least one predetermined criteria;
a set of landmarks or visual cues associated with each set of detailed directions to define a path for guidance from the waypoint to the destination;
a set of visual cues available in response to passing the destination; and
a set of recovery directions available in response to passing the destination; and
wherein a distance of the path from the waypoint to the destination is determined; and one of:
the detailed travel directions are rejected in response to the distance of the path exceeding a predetermined threshold; and
the detailed travel directions are ranked as unfavorable in response to the distance of the path exceeding the predetermined threshold; wherein
the distance of the path defined by the detailed travel directions by the navigation device is determined; and
a safeguard that the detailed travel directions are bogus is provided in response to the distance from the waypoint to the destination exceeding the predetermined threshold.

3. A computer program product to improve navigation accuracy, comprising:
non-transitory computer readable storage medium having computer readable program code embodied therein, the computer readable medium comprising:
computer readable program code configured to provide detailed travel directions from a waypoint to a destination in response to receiving the destination and the detailed travel directions from the waypoint to the destination being available, wherein the waypoint comprises a location proximate to the destination, and wherein the detailed travel directions comprise landmarks or visual cues to define a path for guidance from the waypoint to the destination, the detailed travel directions being provided and customized by an entity located at the destination; and
computer readable program code configured to determine a distance of the path from the waypoint to the destination; and one of:
computer readable program code configured to reject the detailed travel directions in response to the distance of the path exceeding a predetermined threshold; and computer readable program code configured to rank the detailed travel directions as unfavorable in response to the distance of the path exceeding the predetermined threshold;

computer readable program code configured to determine the distance of the path defined by the detailed travel directions by the navigation device; and computer readable program code configured to provide a safeguard that the detailed travel directions are bogus in response to the distance from the waypoint to the destination exceeding the predetermined threshold.

4. The method of claim 1, further comprising prompting the user for a travel time and date in response to time sensitive detailed travel directions being available from the waypoint to the destination.

5. The method of claim 1, further comprising providing a list of different multiple detailed travel directions in response to multiple detailed directions being available.

6. The method of claim 1, further comprising providing a ranked list of different multiple sets of detailed travel directions in response to different multiple sets of detailed travel directions being available, wherein the different multiple sets of detailed travel directions are ranked according to at least one predetermined criteria, the at least one predetermined criteria comprising previous user feedback, and previous user ranking.

7. The method of claim 1, further comprising providing at least one of missed destination visual cues and recovery instructions.

8. The method of claim 1, further comprising providing a graphical representation of the detailed travel directions.

9. The navigation service of claim 2, further comprising means for ranking the multiple sets of detailed directions based on previous user feedback, and previous user ranking.

10. The navigation service of claim 2, wherein the at least one predetermined criteria for sorting or ranking the multiple sets of detailed directions comprises any time sensitive information, previous user feedback, previous user ranking, most scenic routes, shortest travel time, shortest travel distance, most use of expressways, least use of expressways and any other parameters entered by a user.

11. The computer program product of claim 3, further comprising computer readable program code configured to prompt a user for a travel time and date in response to time sensitive detailed travel directions being available from the waypoint to the destination.

12. The computer program product of claim 3, further comprising computer readable program code configured to provide at least one of:
- a set of time sensitive detailed directions;
- a list of multiple sets of detailed directions sorted or ranked by at least one predetermined criteria;
- a set of visual cues available in response to passing the destination;
- a set of recovery directions available in response to passing the destination; and
- a set of graphical representations of a route defined by the detailed directions.

13. The computer program product of claim 3, further comprising computer readable program code configured to provide a ranked list of different multiple sets of detailed travel directions in response to different multiple sets of detailed travel directions being available, wherein the different multiple sets of detailed travel directions are ranked according to at least one predetermined criteria, the at least one predetermined criteria comprising any time sensitive information, previous user feedback, previous user ranking, most scenic routes, shortest travel time, shortest travel distance, most use of expressways, least use of expressways and any other parameters entered by a user.

14. The computer program product of claim 3, further comprising computer readable program code configured to provide a graphical representation of the detailed travel directions.

15. The computer program product of claim 3, further comprising computer readable program code configured to provide at least one of a missed destination visual cue and recovery instructions in response to traveling past the destination.

* * * * *